(12) United States Patent
Bowden

(10) Patent No.: US 8,584,800 B2
(45) Date of Patent: Nov. 19, 2013

(54) LOAD MONITORING SYSTEM

(75) Inventor: Frank Roger Bowden, Totternhoe (GB)

(73) Assignee: NiftyLift Limited (GB)

( * ) Notice: Subject to any disclaimer, the term of this patent is extended or adjusted under 35 U.S.C. 154(b) by 59 days.

(21) Appl. No.: 13/121,402

(22) PCT Filed: Sep. 8, 2009

(86) PCT No.: PCT/GB2009/002143
§ 371 (c)(1),
(2), (4) Date: May 19, 2011

(87) PCT Pub. No.: WO2010/037999
PCT Pub. Date: Apr. 8, 2010

(65) Prior Publication Data
US 2011/0209943 A1    Sep. 1, 2011

(30) Foreign Application Priority Data
Sep. 30, 2008   (GB) .................................. 0817845.1

(51) Int. Cl.
*B66F 11/04*      (2006.01)
(52) U.S. Cl.
USPC ................................................ 182/18; 182/19
(58) Field of Classification Search
USPC ...................................... 182/18, 19
See application file for complete search history.

(56) References Cited

U.S. PATENT DOCUMENTS

| | | | | |
|---|---|---|---|---|
| 3,952,879 A | * | 4/1976 | Grove | 212/278 |
| 4,068,773 A | * | 1/1978 | Downing et al. | 414/636 |
| 4,456,093 A | * | 6/1984 | Finley et al. | 182/2.2 |
| 5,224,815 A | | 7/1993 | Abels et al. | |
| 5,557,526 A | * | 9/1996 | Anderson | 701/50 |
| 5,913,379 A | * | 6/1999 | Young et al. | 182/2.7 |
| 7,395,727 B2 | * | 7/2008 | Moore | 73/866.5 |
| 7,493,987 B2 | * | 2/2009 | Puszkiewicz et al. | 182/69.5 |
| 2002/0144862 A1 | | 10/2002 | Engvall | |
| 2010/0181143 A1 | * | 7/2010 | Bowden | 182/112 |
| 2011/0042161 A1 | * | 2/2011 | Burghardt et al. | 181/148 |

FOREIGN PATENT DOCUMENTS

| | | |
|---|---|---|
| DE | 298 12 736 U1 | 7/1998 |
| DE | 2 981 736 | 10/1998 |
| EP | 1 396 468 | 3/2004 |
| WO | WO 2008/155554 | 12/2008 |

OTHER PUBLICATIONS

International Search Report dated Dec. 17, 2009 issued in corresponding PCT Application No. PCT/GB2009/002143, filed Sep. 8, 2009.
The UK Search Report issued in corresponding Application No. GB 0817845, dated Jan. 23, 2009.

* cited by examiner

*Primary Examiner* — Alvin Chin Shue
(74) *Attorney, Agent, or Firm* — Knobbe Martens Olson & Bear LLP

(57) ABSTRACT

A load monitoring system (14) is provided for a mobile work platform that includes an operator platform (6), a base (2) and a lift mechanism (5) for lifting the operator platform relative to the base. The load monitoring system includes a load cell (12) for monitoring the load on the operator platform (6) and a control device (16) for controlling operation of the work platform, wherein the control device (16) is constructed and arranged to sense and monitor both static and dynamic loads on the operator platform.

12 Claims, 3 Drawing Sheets

LOAD MONITORING SYSTEM

RELATED APPLICATIONS

The instant application is the U.S. National Phase under 35 U.S.C. §371 of International Application No. PCT/GB2009/002143 entitled LOAD MONITORING SYSTEM, filed Sep. 8, 2009, designating the U.S., which claims priority under 35 U.S.C §119(a)-(d) to Great Britain Patent Application No. 0817845.1, filed Sep. 30, 2008. The content of these applications is herein incorporated by reference in its entirety.

FIELD OF THE INVENTION

The present invention relates to a load monitoring system for a work platform and to a work platform having a load monitoring system. In particular but not exclusively the invention relates to mobile work platforms and load monitoring systems therefor.

BACKGROUND OF THE INVENTION

Mobile work platforms typically include a cage or platform that is designed to receive one or more human operators. The cage is mounted on a lift mechanism, such as a hydraulic boom or a scissor lift mechanism, that allows its height to be adjusted. The mobile work platform also includes a wheeled or tracked chassis, which allows it to be moved easily to a desired location. Various types of mobile work platform are available, including self-propelled, self-drive, trailer and vehicle-mounted platforms.

A load monitoring system is generally included to provide cage overload protection. Cage overload protection is required on mobile elevating work platforms as defined by European standard EN280:2001 Amendment 1. European standard EN954 is cited by EN 280 and describes the requirements for safety switches in electrical systems providing overload protection. EN954 Category 3 requires that common mode faults resulting from damage to the protection system are taken into account, if the probability of such a fault occurring is significant.

The main requirement of the aforesaid standards is that the load monitoring system monitors the static load and either provides an alarm or restricts operation of the work platform if the static load exceeds a predetermined limit. During operation of the work platform the dynamic load on the cage may increase or decrease depending on the acceleration of the operator cage. To avoid unintentional activation of the control system whenever the dynamic load exceeds the predetermined limit, the overload protection system is generally disabled during operation of the work platform. The static load safety limit is therefore set at a relatively low level to provide a safety margin that is sufficient to ensure that dynamic loads encountered during normal operation of the work platform do not jeopardise its stability.

Although the aforesaid safety standards provide a good degree of protection when the work platform is being operated correctly, dangers can still arise through careless or inattentive use. For example, when the work platform is being operated in the vicinity of an overhead obstruction, there is a danger that the operator platform may be driven into the obstruction by operation of either the lift mechanism or the drive mechanism for the wheels or tracks. This may endanger a human operator occupying the platform. A load monitoring system of the type described above would provide no protection in such a situation, as it would be disabled during operation of the lift mechanism or the drive mechanism.

SUMMARY OF THE INVENTION

It is an object of the present invention to provide a mobile work platform and a load monitoring system for a mobile work platform that mitigate at least some of the aforesaid disadvantages.

According to one aspect of the present invention there is provided a load monitoring system for a work platform having an operator platform, a base and a lift mechanism for lifting the operator platform relative to the base, the load monitoring system including a load cell for monitoring the load on the operator platform and a control system for controlling operation of the work platform, wherein the control system is constructed and arranged to sense and monitor both static and dynamic loads on the operator platform.

The system is able to operate continuously during movement of the operator cage and to distinguish between static, dynamic and impact loads. It is therefore able to prevent damage to the platform caused by impacting an obstruction, and to protect the operator of the platform against possible injury.

The ability of the load monitoring system to distinguish between static and dynamic loads also allows use of the platform to be monitored continuously without causing the lift mechanism drive to cut out whenever the dynamic load caused by acceleration of the operator cage exceeds the predetermined maximum static load. The system does not therefore suffer from "nuisance tripping", which can be very annoying for the operator. It also reduces the risk of the operator being stranded in mid air if the system cuts out while the platform is elevated. Furthermore, data relating to usage of the platform can be continuously collected and stored for later analysis in the event of an accident, or for maintenance and repair purposes.

Advantageously, the control system includes means for measuring the static load on the operator platform, means for sensing movement of the operator platform, means for predicting the dynamic load on the operator platform, means for comparing the actual load with the predicted dynamic load, and means for providing an alarm and/or restricting operation of the work platform if the difference between the actual load and the predicted dynamic load exceeds a predetermined limit.

The means for sensing movement of the operator platform may include means for sensing operation of the lift mechanism and/or means for sensing acceleration of the operator platform.

The means for sensing movement of the operator platform may include means for sensing movement of the base.

The control system may include means for providing an alarm and/or restricting operation of the work platform if the static load exceeds a predetermined limit.

According to another aspect of the invention there is provided a mobile work platform that includes an operator platform, a base and a lift mechanism for lifting the operator platform relative to the base, and a load monitoring system according to any one of the preceding statements of invention.

Advantageously, the load cell is connected between the lift mechanism and the operator platform.

BRIEF DESCRIPTION OF THE DRAWINGS

An embodiment of the invention will now be described by way of example, with reference to the accompanying drawings, in which.

DETAILED DESCRIPTION OF THE PREFERRED EMBODIMENT

Figure 1:
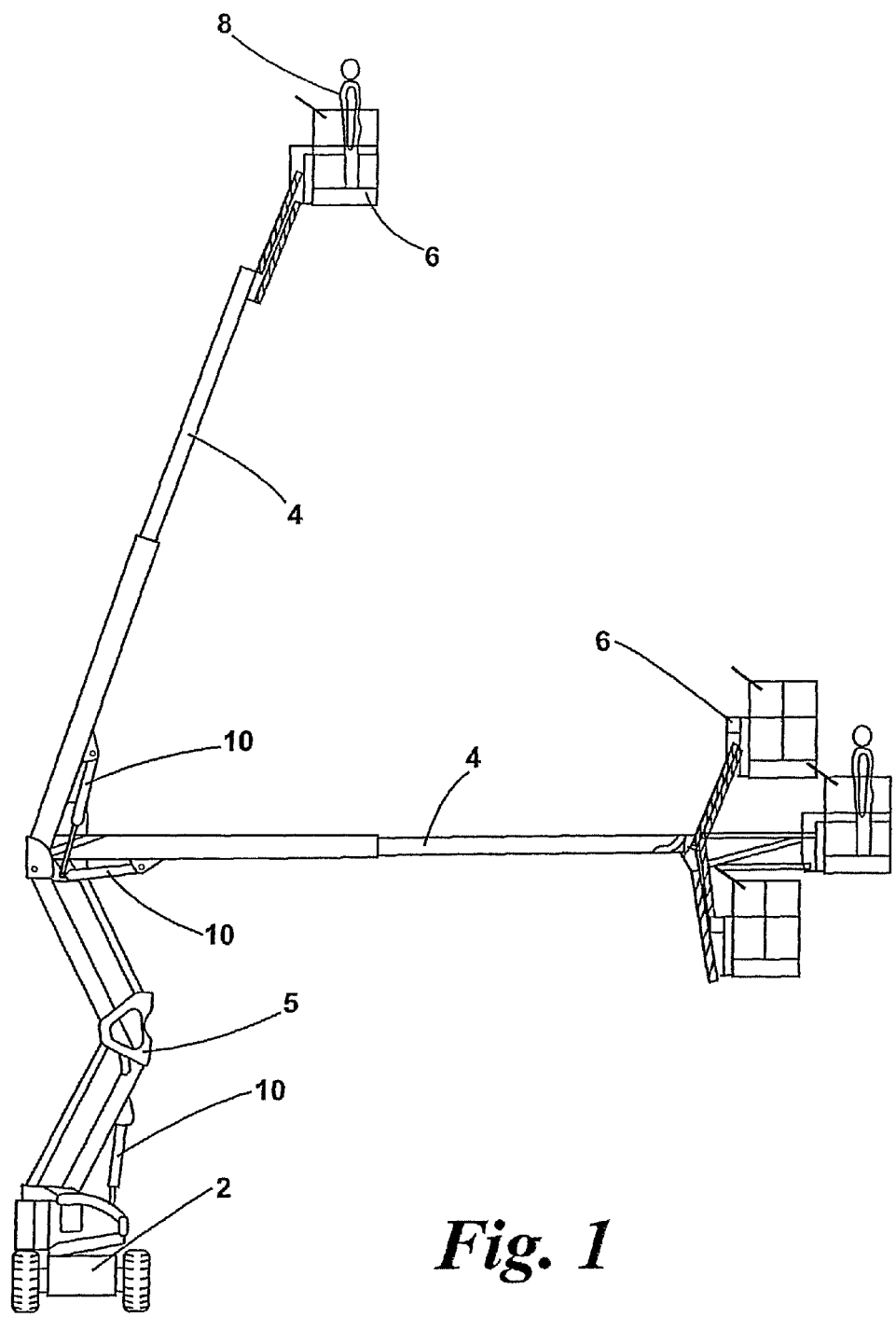
FIG. 1 is a front elevation of a mobile work platform according to an embodiment of the invention, in various operating configurations.

FIG. 1 shows a typical mobile work platform according to an embodiment of the invention, which includes a wheeled base unit 2, a hydraulically operated lift mechanism comprising a boom 4 and a lifting structure 5, and an operator platform (or cage) 6 for a human operator 8. The boom 4, which is shown here in various operating configurations, may be retracted and folded onto the base unit 2 for transportation or storage. Movement of the boom 4 is controlled by hydraulic cylinders 10, which are connected by hydraulic hoses (not shown) to a hydraulic drive system. Hydraulic motors may also be provided for driving the wheels. The components shown in FIG. 1 are all conventional and will not therefore be described in detail. It should be understood that the mobile work platform may take various alternative forms.

Figure 2:
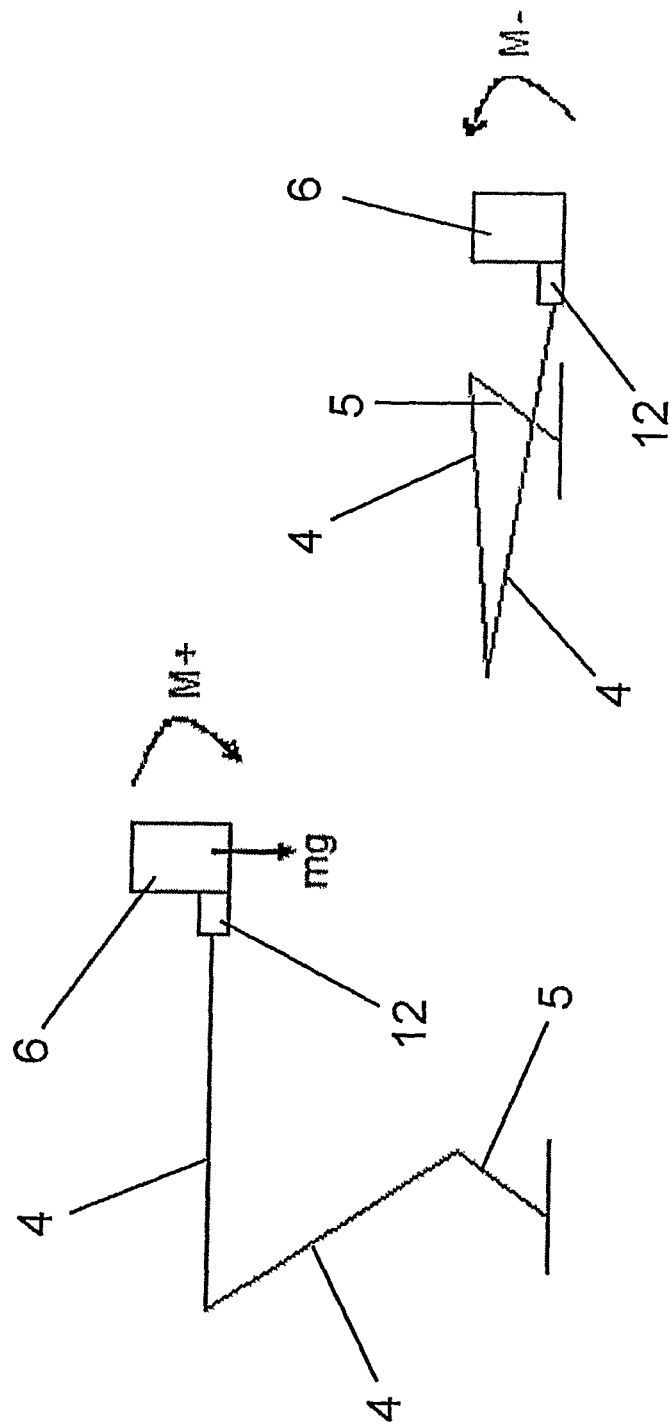
FIGS. 2a and 2b are schematic side views of a mobile work platform in two different configurations.
Figure 3:
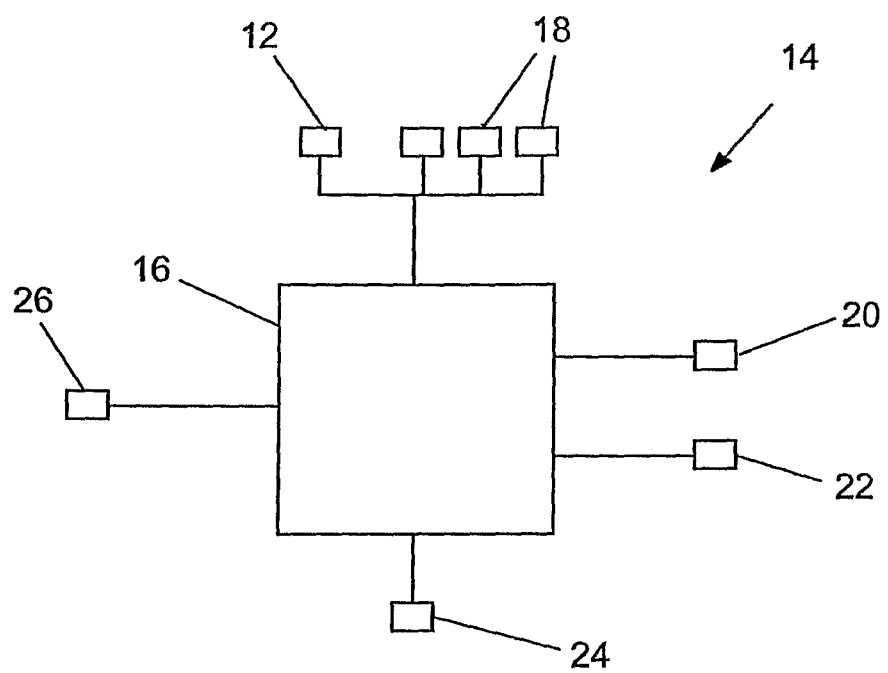
FIG. 3 is a system diagram illustrating the main components of a load monitoring system.

As shown schematically in FIGS. 2a and 2b, the cage 6 is connected to the boom 4 via a load cell 12. The load cell 12 is conventional in design and comprises an aluminium block that acts as a cantilever spring and carries one or more strain gauges, preferably of the resistive foil type. The strain gauges are connected to a load monitoring system 14, for example as illustrated in FIG. 3.

As shown in FIG. 2a, when the cage 6 is static the load cell 12 supports a downwards load mg equal to the mass in of the cage and its contents multiplied by gravity g. It therefore experiences a positive moment M+ (shown as clockwise in the drawing). The strain in the load cell produced by this moment is measured by the strain gauges and used to calculate the static load in the cage. If the load exceeds a predetermined limit, the load monitoring system 14 sounds an alarm to warn the user and/or activates a cut-out device to prevent or restrict operation of the platform.

During operation of the work platform, the load cell 12 will experience a dynamic load which is equal to the static load plus an acceleration force component that depends on the rate of acceleration of the cage 6 and its mass. The acceleration force component may be positive or negative, depending on the direction of acceleration. For example, if the cage is accelerating upwards or decelerating downwards, the dynamic load will be greater than the static load, whereas if the cage is decelerating upwards or accelerating downwards, the dynamic load will be less than the static load.

In the present invention, the load cell is constructed and arranged to operate both when the cage is static and also during movement of the cage, so that it detects both the static load and the dynamic load during operation of the platform. This allows the system to sense certain potentially hazardous situations, as described in more detail below.

The main components of the load monitoring system 14 are shown in FIG. 3. These include a central processor unit (CPU) 16, which is connected to receive signals from the load cell 12 and also from one or more additional sensors 18. These additional sensors may for example be arranged to sense control signals that control operation of the lift mechanism and/or the drive mechanism, or they may sense actual operation of the lift mechanism and/or the drive mechanism. Alternatively, one or more of the sensors 18 may consist of an accelerometer that is attached to the cage to sense the acceleration of the cage directly.

The CPU 16 is also connected to a control device 20 for controlling operation of the platform, an alarm device 22, an input/output unit 24 for transferring data or commands to and from the CPU 16, and a memory device 26 for storing data and/or commands.

During use, the CPU 16 receives a first set of signals from the load cell 12 indicating the actual load (the static load or the dynamic load) on the cell. It also receives a second set of signals from the additional sensors 18. The second set of signals relate to the movement of the cage and the CPU 16 uses these signals to sense or predict that movement.

When the CPU 16 senses that the cage is stationary, it uses the signals from the load cell 12 to sense the static load. This value is recorded in the memory 26. If the static load is less than a pre-determined static load limit, operation of the platform is permitted. However, if the static load is greater than the pre-determined static load limit, the CPU 16 is programmed to respond either by restricting operation of the cage via the control device 20 and/or by generating an overload warning via the alarm device 22.

During operation of the platform, the CPU 16 uses the second set of signals from the additional sensors 18 to sense movement of the cage and uses these signals to predict the dynamic load on the cage, based on the known static load and the acceleration of the cage. The CPU 16 then compares the predicted dynamic load with the actual dynamic load measured by the load cell 12. If these two values agree to within a pre-determined error margin, no further action is taken as this indicates safe operation of the platform. However, if the CPU 16 detects a difference between the predicted dynamic load and the actual sensed load, and this difference exceeds the pre-determined error margin, it is programmed to restrict further operation of the platform via the control system 20, and/or to generate a warning signal via the alarm system 22. In the case where operation of the platform is restricted, the CPU 16 may be programmed either to prevent all further movement of the cage, or to allow only restricted movement of the cage, for example in a direction that it determines to be safe.

In this way, the load monitoring system is able to detect various potentially hazardous situations and take action to warn the operator of the situation and/or protect against an accident. For example, if during operation of the lift mechanism the cage collides with an overhead obstruction, this will increase the strain on the load cell. The CPU 16 will sense the difference between this increasing load and the predicted dynamic load and it will respond by terminating operation of the lift mechanism in the direction causing the increasing load. It may however permit movement of the cage in the opposite direction, allowing the cage to be maneuvered away from the obstruction.

Similarly, if the cage collides with an obstruction while the platform is being driven from one location to another, the load monitoring system will detect the difference between the load sensed by the load cell and the predicted dynamic load, and the CPU 16 will respond by deactivating the drive mechanism to the wheels of the platform. In this way, damage to the platform and harm to the operator of a platform can be prevented.

The system therefore monitors the rate of change of load (acceleration), the load amplitude, load direction and function activation signals for the lift mechanism and the drive, and determines the machine's mode of operation by comparing these parameters with known combinations. It is therefore able to ascertain whether the machine is static and overloaded, operating normally with induced loads in excess of the static load limit, or being driven into a static object by operation of either the lift mechanism or the drive mechanism. The system is able to respond as appropriate to any one of these conditions, for example by suspending machine functions and preventing further activation, by reducing function speed but allowing continued use, by providing a warning signal or by any combination thereof.

Various modifications of the load detection system are of course possible. For example, instead of preventing operation of the mobile work platform, the load monitoring system may be arranged to limit the boom operating speed to a fraction of its normal value. If both an alarm and a cut-off device are provided, these may have different trigger points so that the alarm is activated at a lower level than the cut-off device.

The invention claimed is:

1. A load monitoring system for a work platform, said system comprising:
    an operator platform,
    a base,
    a lift configured to lift the operator platform relative to the base,
    a load cell for monitoring the load on the operator platform,
    a central processor unit (CPU) receiving signals from the load cell and from one or more sensors that sense movement of the operator platform,
        said sensors being selected from the group consisting of a sensor that senses control signals that control operation of the lift or motion of the base, a sensor that senses actual operation of the lift or motion of the base, and an accelerometer that senses acceleration of the operator platform;
        said CPU predicting
            the dynamic load caused by movement of the operator platform based on input from said sensors and said signals from the load cell,
            comparing an actual load measured by the load cell with the predicted dynamic load, and
            providing an alarm and/or restrict operation of the work platform if a difference between the actual load and the predicted dynamic load exceeds a predetermined limit.

2. The load monitoring system of claim 1, further comprising an alarm.

3. The load monitoring system of claim 1, wherein the lift comprises one or more of the following: a boom or a scissor lift.

4. The load monitoring system of claim 1, wherein the lift comprises one or more of the following: a hydraulic lift, pneumatic lift, or a mechanical lift.

5. The load monitoring system of claim 1, wherein the load cell comprises an aluminum block acting as a cantilever spring and contains one or more strain gauges.

6. The load monitoring system of claim 5, wherein the one or more strain gauges comprise resistive foil-type gauges.

7. The load monitoring system of claim 1, wherein the CPU is configured to continuously gather and store data in a memory relating to usage of any of the following: the operator platform or the base.

8. The load monitoring system of claim 1, wherein said CPU is further configured to
    determine a static load from said signals from the load cell when said operator platform is stationary,
    sense operation of the operator platform, and/or
    generate an overload warning when the static load exceeds a pre-determined static load limit.

9. A mobile work platform comprising the monitoring system of claim 1.

10. A method for monitoring a load system in a work platform comprising:
    providing a load monitoring system according to claim 1,
    sensing a load on the operating platform;
    sensing movement of the operator platform by sensing one or more of the following actions or signals:
        control signals that control operation of the lift or movement of the base,
        operation of the lift, and
        acceleration of the lift;
    predicting the dynamic load caused by movement of the work platform based on the sensed load and the sensed actions or signals;
    comparing the sensed load with the predicted dynamic load; and
    providing the alarm and/or restricting operation of the work platform if the difference exceeds the predetermined limit.

11. The method of claim 10, further comprising: continuous gathering and storage of data relating to usage of any of the following: the operator platform or the base.

12. The method of claim 10 further comprising:
    determining a static load of the operator platform when said operator platform is stationary,
    sensing operation of the operator platform, and/or
    generating an overload warning when the static load exceeds a pre-determined static load limit.

* * * * *